United States Patent
Riggs et al.

(10) Patent No.: US 8,667,396 B2
(45) Date of Patent: Mar. 4, 2014

(54) MASTER SLAVE REGION BRANDING

(75) Inventors: Brian Riggs, San Francisco, CA (US); Daniel John Cooley, San Francisco, CA (US); Joel Huff, San Francisco, CA (US); Jeremy R. Clark, San Rafael, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1167 days.

(21) Appl. No.: 11/779,644

(22) Filed: Jul. 18, 2007

(65) Prior Publication Data
US 2013/0326402 A1 Dec. 5, 2013

(51) Int. Cl.
G06F 3/00 (2006.01)

(52) U.S. Cl.
USPC ........... 715/716; 715/719; 715/730; 715/764; 715/781; 715/810; 715/853; 715/854; 715/855; 725/37; 725/38; 725/39; 725/44

(58) Field of Classification Search
USPC ......... 715/716, 719, 730, 764, 781, 810, 853, 715/854, 855; 725/37, 38, 39, 44
See application file for complete search history.

(56) References Cited

U.S. PATENT DOCUMENTS

| | | | |
|---|---|---|---|
| 6,791,581 B2 * | 9/2004 | Novak et al. | 715/744 |
| 7,143,428 B1 * | 11/2006 | Bruck et al. | 725/37 |
| 7,320,109 B1 * | 1/2008 | Zeevi et al. | 715/763 |
| 7,512,622 B2 * | 3/2009 | Volk et al. | 1/1 |
| 7,574,448 B2 * | 8/2009 | Volk et al. | 1/1 |
| 7,631,260 B1 * | 12/2009 | Riggs et al. | 715/716 |
| 7,631,330 B1 * | 12/2009 | Des Jardins | 725/44 |
| 8,250,614 B1 * | 8/2012 | Ellis et al. | 725/87 |
| 2004/0254956 A1 * | 12/2004 | Volk | 707/104.1 |
| 2005/0028200 A1 * | 2/2005 | Sardera | 725/42 |
| 2005/0102626 A1 * | 5/2005 | Novak et al. | 715/744 |
| 2005/0102627 A1 * | 5/2005 | Novak et al. | 715/744 |
| 2006/0020890 A1 * | 1/2006 | Kroll et al. | 715/716 |
| 2006/0053470 A1 * | 3/2006 | Colter et al. | 725/135 |
| 2007/0154163 A1 * | 7/2007 | Cordray | 386/52 |
| 2007/0250864 A1 * | 10/2007 | Diaz Perez | 725/52 |

* cited by examiner

Primary Examiner — Steven Sax
Assistant Examiner — David Choi
(74) Attorney, Agent, or Firm — Kilpatrick Townsend & Stockton LLP

(57) ABSTRACT

Methods and apparatus provide for a region brander configured to uniformly apply branding (i.e graphical modifications) upon both content data and application data to effectuate a seamless branding of an entire region of a graphical user interface (GUI). The region brander defines a hierarchy relationship between content and a branding extension (i.e. embedded modification information) with respect to a region in a Graphical User Interface (GUI). The region brander further defines a master region in the GUI to apply the hierarchy relationship to display the content and the branding extension in the master region. A slave region in the GUI can also be defined to apply the hierarchy relationship in order to: (i) display, in the slave region, the branding extensions related to content selected in the master region, and (ii) display episodic content related to content selected in the master region.

11 Claims, 6 Drawing Sheets

410 DEFINE A HIERARCHY RELATIONSHIP BETWEEN CONTENT AND EMBEDDED MODIFICATION INFORMATION WITH RESPECT TO AT LEAST ONE REGION IN A GRAPHICAL USER INTERFACE (GUI) OF AN APPLICATION, THE EMBEDDED MODIFICATION INFORMATION IDENTIFYING GRAPHICAL MODIFICATIONS TO BE MADE TO THE REGION OF THE GUI BASED ON A SELECTION OF THE CONTENT AND A PRESENTATION OF THE CONTENT

420 ASSOCIATE THE CONTENT AND THE EPISODIC CONTENT WITH THE EMBEDDED MODIFICATION INFORMATION TO INDICATE THE EMBEDDED MODIFICATION INFORMATION CAN BE DISPLAYED IN AT LEAST ONE OF THE MASTER REGION AND THE SLAVE REGION BASED ON AT LEAST ONE OF:

(I) DISPLAY OF AT LEAST ONE OF THE CONTENT AND THE EPISODIC CONTENT; AND (II) SELECTION OF AT LEAST ONE OF THE CONTENT AND THE EPISODIC CONTENT

430 DEFINE A MASTER REGION IN THE GUI TO APPLY THE HIERARCHY RELATIONSHIP IN ORDER TO DISPLAY THE CONTENT AND THE EMBEDDED MODIFICATION INFORMATION IN THE MASTER REGION

440 DEFINE A SLAVE REGION IN THE GUI TO APPLY THE HIERARCHY RELATIONSHIP IN ORDER TO:

(I) DISPLAY, IN THE SLAVE REGION, THE EMBEDDED MODIFICATION INFORMATION RELATED TO CONTENT SELECTED IN THE MASTER REGION; AND (II) DISPLAY, IN THE SLAVE REGION, EPISODIC CONTENT RELATED TO CONTENT SELECTED IN THE MASTER REGION, THE EPISODIC CONTENT COMPRISING A SUBSET OF PORTIONS OF THE CONTENT SELECTED IN THE MASTER REGION

FIG. 4

MASTER SLAVE REGION BRANDING

BACKGROUND

Today, many conventional computer systems employ graphical user interfaces (GUIs) which users may use to interact with the systems. GUIs often employ graphical elements, such as images, widgets, icons and the like, which may represent information and actions available to a user. The actions are usually performed through direct manipulation of the graphical elements.

Many GUIs employ windows which are often used by applications running on a computer system to interact with users. Here, a window may be defined as a visual area, usually rectangular in shape, that contains an interface that may be used to display the output and/or allow the input of information associated with the applications. GUIs that employ windows are often called windowing systems. Examples of windowing systems include, e.g., the X windows system and Microsoft Windows.

Typical windowing systems employ window managers to control the placement and appearance of windows on a display. The display may include a desktop which is an area that is displayed behind the windows. In a typical arrangement, the window manager displays the windows on top of the desktop by "overlaying" areas of the desktop with the windows such that the windows are seen but not the areas of the desktop behind the windows.

Many window managers include functions that enable windows to be added and deleted from a display. For example, a window manager may contain a function that may be called (invoked) by an application to create a window at a particular location of the display. Likewise, a window manager may contain a function that enables an application to direct the window manager to remove a window from the display. Often when a window is created for an application, the window manager usually renders only a frame for the window on the display. After rendering the frame, the window manager may then notify the application that the frame has been rendered. After receiving the notification the application may render application specific information within the window's frame.

Typical user interfaces (e.g., GUIs) often times implement a page metaphor, in which transitions from one state to another result in the previous page disappearing and being replaced with a new page. With traditional web content and application interfaces, a user selects an item from a list of available options and the display is refreshed such that the display presents to the user an updated view. Typically the entire page is refreshed. In some scenarios, a bread crumb trail or meta navigation is provided which allows the user to find their way back to where they came from.

Additionally, current computer networks allow the distribution of information between many numbers of computer systems. Various computer program applications (i.e. software) and data communications protocols support a wide variety of different types of data communications and information exchange. As an example, a computer user using a web browser software application that operates on a local computer system can communicate using a hypertext transport protocol with remote computer systems known as web servers over a computer network such as the Internet to obtain web page content for viewing by the user on a local computer system. Other types of communication mechanisms include electronic mail, instant messaging, voice over network communication, and so forth.

One type of communication mechanism that is becoming popular is "syndicated streaming" or "feed" communication that allows a computer program known as a streaming feed reader or aggregator to operate on a networked computer system to periodically check a list of syndicated stream data "feeds" on behalf of a user and display any updated articles or other content that the application finds within those feeds. Feed readers or aggregators are able to subscribe to streaming data feeds that are essentially specially formatted files provided from remote computer systems such as web sites or other servers that are of interest to a user operating the aggregator. A set of standardized data formats collectively known as Really Simple Syndication (RSS) provide a simple extensible markup language (XML) based system that allows content or feed providers to identify available "channels" of content items in one of the RSS formats and allows users to subscribe to their favorite websites using the aggregator application. The aggregator is able to read the RSS formatted feed(s) selected by the user to list available content items within each channel (i.e. within each feed) for viewing by the user. Using RSS, webmasters or other content providers can thus put their content items into a standardized RSS data format (e.g., an XML format conforming to standard tags and conventions to list and describe content items), which can be accessed, viewed and organized through RSS-aware aggregator software or automatically conveyed as new content on another website.

A typical RSS streaming data feed comprises an XML file that defines a channel, and RSS standardized tags to define a title, link, description, and other optional fields/tags, followed by a series of content items, each of which have a set of tags used to indicate a title, link, and description of that content item. There can be many sets of content items (i.e. title, link and description tags with other optional fields/tags) in a single feed file and the RSS formatted files conform to one of several different standard RSS XML data formats (examples of which include RSS 1.0, RSS 2.0, Atom 0.3, and Atom 1.0). It is now common to find RSS (examples of which include RSS 1.0, RSS 2.0, Atom 0.3, and Atom 1.0) web feeds available for access on major or popular websites as well as on many smaller or less popular ones. RSS-aware aggregator or feed reader programs are available for download to various operating systems such as Windows and MacOS. Client-side RSS-based readers and aggregators are typically constructed as standalone programs or extensions to existing programs such as web browsers and are able to interpret the RSS data format to present the channels and associated content items for selection by a user for viewing.

Any type of content that can be broken down into discrete content items can be syndicated via RSS. As an example, content such as recent changes to a web page such as a weblog, a revision history of a book, new episodes of a TV show, new songs available from an artist, or the like can each be identified and formatted into an RSS feed. Once information about each content item is in RSS format, an RSS-aware program such as an aggregator can periodically check one or more feeds for changes and react to the changes in an appropriate way such as by displaying the newly available content selections for access by the user. Popular websites that are continuously developing new content for viewing by a user utilize RSS streaming data feeds to publish the content for access by aggregator applications operated by users who are interested in keeping up with current content available from those sites. A user may subscribe to many different feeds, each also known as a channel.

A typical aggregator program provides a graphical user interface that includes multiple display regions. A channel display region identifies various RSS feeds or "channels" that the user has configured the aggregator to obtain. When a user selects a particular channel in the channel display region, a content item selection region of the graphical user interface displays content items (e.g. as thumbnail icons, lists, or other list-oriented views) available from the channel (i.e., items described in the RSS data format for that feed). As an example, if the user selects a news channel from the channel selection region, the aggregator application will obtain the current RSS feed for that news channel and will display available content selections such as recent new stories within the content selection region. Each content item can be shown, for example, as a thumbnail or icon or textual line item representing content available for presentation to the user if the user were to chose that content item icon. The content item selections for a particular channel are independently identified within the RSS data format. Once the content items for a particular channel are shown for selection by the user, the user may then select a particular content item from the content selection region. In response, the aggregator will then obtain that item of content (e.g., by referencing a URL encoded within the RSS data format for that content item) and will play or otherwise reproduce or present that content in a content presentation display region (e.g., a play window) on the graphical user interface of the aggregator. Often the content items are videos or multimedia presentations, though they may be simply web pages or static text or audio. If the user selects a different channel from the channel selection region, the aggregator will read the current feed for that channel and change the content items within the content selection region to show the current content items available for the new channel selection. Again, the user may select a particular content item associated with that channel for viewing and the aggregator will access that particular content item and play that content in the content presentation region.

SUMMARY

Conventional systems such as those explained above suffer from a variety of deficiencies. In particular, conventional systems, such as iTunes from Apple, Inc., do not provide a user with dynamic graphical modifications to content data and application data according to user navigation. In other words, conventional systems that deliver media content seek to create clear graphical distinctions between the application that is delivering the content and the content that is being delivered. For example, a window in iTunes that lists a user's collection of TV shows maintains a default graphical presentation—regardless if all the TV shows are from a common publisher (e.g. MTV, Vh1). If the iTunes user selects a particular show, the user is presented with a view of that particular show's episodes. However, the default graphical presentation native to the iTunes application is still maintained for the episode listing view. For both views, the TV show listing and the TV episode listing, there may be graphics related to the content, such as a logo for the TV Show or a title icon for a particular episode. Such content-specific graphics are statically maintained and do not share graphical characteristics with iTunes' native graphical presentation.

Embodiments of the invention significantly overcome such deficiencies and provide mechanisms and techniques that provide a region brander to uniformly apply branding (i.e., graphical modifications) upon both content data and application data to an entire region (or multiple regions) of a graphical user interface (GUI) in order to effectuate a seamless graphical modification in the GUI. For example, the region brander maintains a hierarchy relationship between content and "branding," where "branding" refers to embedded modification information that represents graphical modifications for regions in a GUI. If a region in the GUI lists TV shows from the same publisher, such as MTV (i.e. Music Television), then MTV-style branding can be applied to the region. Specifically, the graphical presentation of both the application and the content in the region can be modified according to the branding. Thus, the region brander provides a user with a greater context as to the type of content currently being listed or displayed.

The hierarchy relationship can apply across multiple regions as well. For instance, where a user selects a particular TV show from a master region that displays a listing of various TV shows, the region brander can dynamically render a slave region to present a listing of that TV show's episodes. The application data and content data in both the master region and the slave region can be branded with graphics that are specific to the TV show selected by the user. The region brander thereby overcomes the graphical distinctions between the application data and content data found in conventional systems. Further, the region brander dynamically "brands" GUI regions according to (1) user navigation in related regions and (2) the publisher or brand of the content with which the user is interacting.

In particular, the region brander defines a hierarchy relationship between content and a branding extension (i.e. embedded modification information) with respect to a region in a Graphical User Interface (GUI). The branding extension comprises graphical modifications to be made to a region of the GUI based on a selection of the content and a presentation of the content. The region brander further defines a master region in the GUI to apply the hierarchy relationship to display the content and the branding extension in the master region. A slave region in the GUI can also be defined to apply the hierarchy relationship in order to: (i) display, in the slave region, the branding extensions related to content selected in the master region, and (ii) display episodic content related to content selected in the master region.

For purposes of this document, it is understood that episodic content is comprised of a subset of portions of the content selected in the master region. Thus, episodic content can be individual episodes of a television show selected from the master region. In the alternative, episodic content can be songs from a playlist selected from the master region. In yet another embodiment of the region brander, episodic content can be chapters (or video frames) of a video selected from the master region. In other words, episodic content in a slave region is related to content from a master region in that it is related content that is divided into separate and related parts.

Other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides an extensible master-slave user interface with distinct interaction models as explained herein that when performed (e.g. when executing) on the processor, operates as explained herein within the computerized device to perform all of the method embodiments and operations explained herein as embodiments of the invention. Thus any computerized device that performs or is programmed to perform the processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an extensible master-slave user interface with distinct interaction models as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Adobe Systems, Incorporated of San Jose, Calif. iTunes and Apple are registered trademarks of Apple Computer, Inc. of Cupertino, Calif., USA.

BRIEF DESCRIPTION OF THE DRAWINGS

The foregoing and other objects, features and advantages of the invention will be apparent from the following more particular description of embodiments of the methods and apparatus for a region brander to uniformly apply branding (i.e., graphical modifications) upon both content data and application data to effectuate a seamless graphical modification of an entire region of a graphical user interface (GUI), as illustrated in the accompanying drawings and figures in which like reference characters refer to the same parts throughout the different views. The drawings are not necessarily to scale, with emphasis instead being placed upon illustrating the embodiments, principles and concepts of the methods and apparatus in accordance with the invention.

FIG. 4 is a flowchart of processing steps performed by a region brander to define a hierarchy relationship, a master region, and a slave region according to embodiments herein.

DETAILED DESCRIPTION

Figure 1:
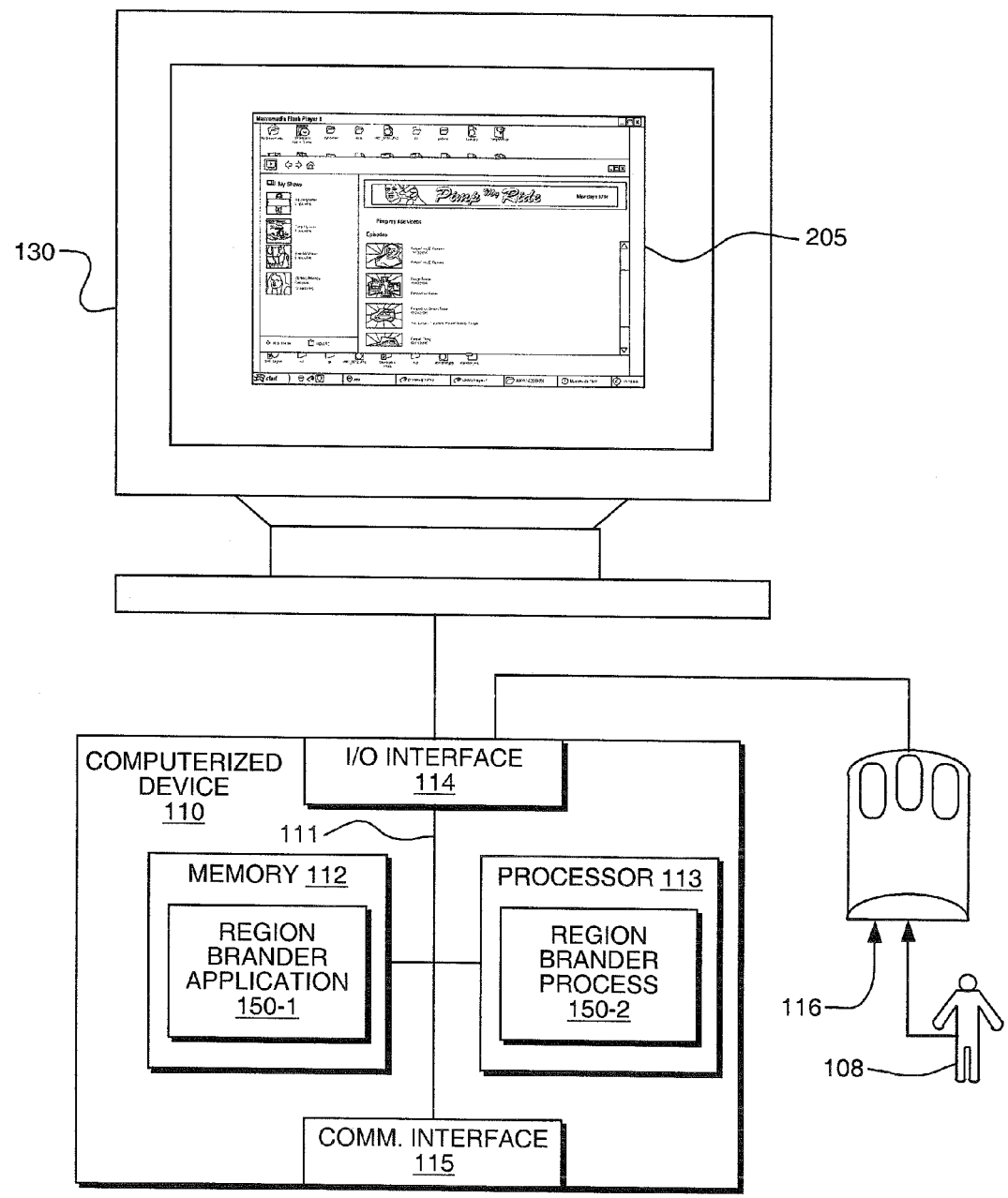
FIG. 1 is a block diagram of a computer system configured with a region brander according to embodiments herein.

Methods and apparatus provide for a region brander configured to uniformly apply branding (i.e., graphical modifications) upon both content data and application data to effectuate a seamless branding of an entire region of a graphical user interface (GUI). The region brander defines a hierarchy relationship between content and a branding extension (i.e. embedded modification information) with respect to a region in a Graphical User Interface (GUI). The branding extension comprises graphical modifications to be made to a region of the GUI based on a selection of the content and a presentation of the content. The region brander further defines a master region in the GUI to apply the hierarchy relationship to display the content and the branding extension in the master region. A slave region in the GUI can also be defined to apply the hierarchy relationship in order to: (i) display, in the slave region, the branding extensions related to content selected in the master region, and (ii) display episodic content related to content selected in the master region. Both the master region and the slave region can be a distinct and independent graphic panel and/or menu within the GUI.

It is to be understood that "branding" or "branding extension" refers to the embedded modification information which represents graphical modifications for regions in a graphical user interface (GUI). Such branding can be applied to both content data and application data of the GUI. Thus, while conventional systems present a user with graphical distinctions between an application that delivers content and the actual content being made available, the region brander can uniformly apply branding upon both content data and application data to effectuate a seamless graphical modification of an entire GUI region.

To account for content hierarchy and related branding (i.e. graphical modifications, branding extensions), the region brander renders regions (e.g. master regions, slave regions) where content is organized according to a hierarchy. The hierarchy is presented via master/slave navigation controls which allow the content's brand to be dynamically displayed as a user navigates through master regions and slave regions via branding extensions.

For example, in one embodiment of the region brander, where the content is a TV show with many episodes, branding can be applied to various regions according to a user's navigation. If a master region lists the TV show among other types of content (e.g. other TV shows, movies), the region brander will not brand the master region if all the content does not share a common publisher or a common brand. As the user selects the TV show from the master region, the region brander can render a slave region to present a listing of episodes of the selected TV show. The slave region can be dynamically rendered to include the TV show's branding. Thus, the branding of the TV show impacts the slave region but not the master region.

Hence, the regions of the region brander are composed of master-slave region relationships. Each region establishes hierarchy rules for the content displayed in that region. The content and the respective branding are made available via RSS feeds. The content associates the branding via extensions to the RSS specific to the region brander.

Via a hierarchy rule, each region (master or slave) declares the type of branding it supports: publisher branding, show branding, both, or neither. When a new region is displayed, the region brander applies the hierarchy rule to check for branding that can be applied to the region. For example, in an embodiment of the region brander, a master region showing a listing of TV episodes and a slave region showing the video content of a particular episode would declare that show branding is supported. Thus, the region brander can apply the branding uniformly across both regions—as a singular presentation of the branding on the graphical user interface. In other words, the branding is shared across both the master region and the slave region.

In the alternative, a master region can instead be a listing of various TV shows and the slave region can be a listing of TV episodes of a particular TV show. Here, the master region (i.e. the TV show listing) can have a hierarchy rule declaring that only publisher branding is supported whereas the slave region (i.e. TV episode listing) supports show branding. The region brander can reconcile the conflicting branding requests, thereby displaying show branding in the slave region (i.e. TV episode listing) but no branding for the master region (i.e. the TV show listing). However, if all the TV shows listed in the master region are from the same publisher, then the region brander can display publishing branding in the master region while the slave region displays the show branding.

Turning now to FIG. 1, a block diagram illustrates an example of architecture for a computer system 110 that executes, runs, interprets, operates or otherwise performs a region brander application 150-1 and/or region brander process 150-2 (e.g. an executing version of the application 150-1 controlled by user 108) according to embodiments herein. The computer system 110 may be any type of computerized device such as a personal computer, a client computer system, workstation, portable computing device, console, laptop, network terminal or the like.

As shown in the present example, the computer system 110 includes an interconnection mechanism 111 such as a data bus, motherboard or other circuitry that couples a memory system 112, a processor 113, an input/output interface 114, and a display 130 presenting a graphical user interface 205 of the region brander 150. An input device 116 (e.g., one or more user/developer controlled devices such as a keyboard, mouse, touch pad, etc.) couples to the computer system 110 and processor 113 through an input/output (I/O) interface 114.

The memory system 112 can be any type of computer readable medium and, in this example, is encoded with a region brander application 150-1 that supports generation, display, and implementation of functional operations as will be further explained herein. During operation of the computer system 110, the processor 113 accesses the memory system 112 via the interconnect 111 in order to launch, run, execute, interpret or otherwise perform the logic instructions of the region brander application 150-1. Execution of the region brander application 150-1 in this manner produces the region brander process 150-2. In other words, the region brander process 150-2 represents one or more portions or runtime instances of the region brander application 150-1 (or the entire application 150-1) performing or executing within or upon the processor 113 in the computerized device 110 at runtime.

Those skilled in the art will understand that the computer system 110 may include other processes and/or software and hardware components, such as an operating system not shown in this example. A display 130 need not be coupled directly to computer system 110. For example, the region brander application 150-1 can be executed on a remotely accessible computerized device via the network interface 115. In this instance, the graphical user interface 104 may be displayed locally to a user 108 of the remote computer, and execution of the processing herein may be client-server based.

During operation of the computer system 110, the processor 113 accesses the memory system 112 via the interconnect 111 in launch, run, execute, interpret or otherwise perform the logic instructions of the region brander application 150-1. Execution of the region brander application 150-1 in this manner produces processing functionality in a region brander process 150-2. In other words, the region brander process 150-2 represents one or more portions or runtime instances of the region brander application 150-1 (or the entire targeted advertisement application 150-1) performing or executing within or upon the processor 113 in the computerized device 110 at runtime.

Figure 2:
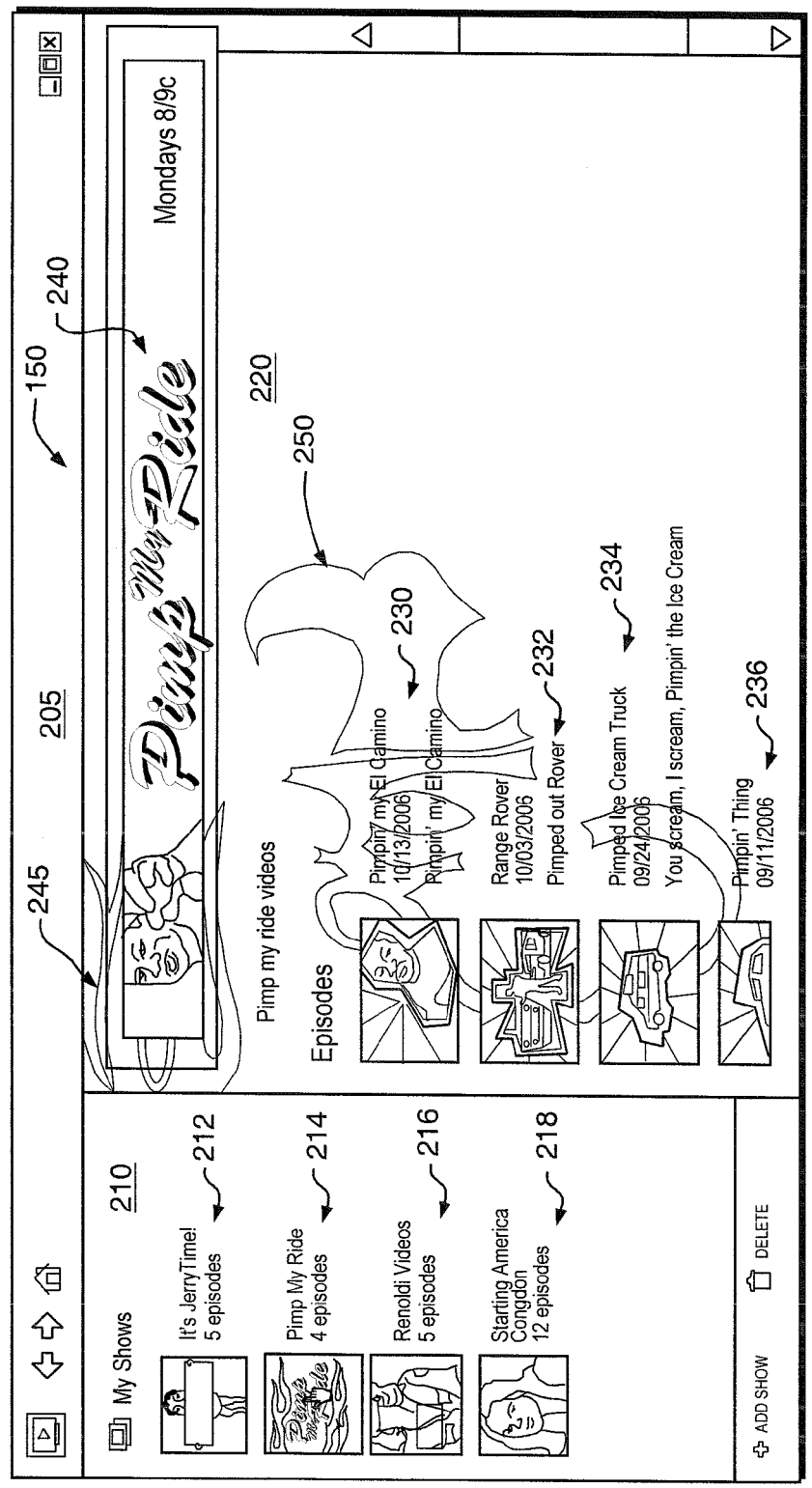
FIG. 2 is a block diagram of a graphical user interface of a region brander according to embodiments herein.

FIG. 2 is a block diagram of a graphical user interface (GUI) of a region brander according to embodiments herein. FIG. 2 includes a GUI 205 of a region brander 150 with a master region 210 and a slave region 220. The master region 210 provides a menu of television shows 212, 214, 216, 218. The slave region 220 displays episodes 230, 232, 234, 236 of a television show that is listed in the master region 210. In addition, the region brander 150 allows for branding 240, 245, 250 to be applied in the slave region 220, but not in the master region 210.

The television shows 212, 214, 216, 218, episodes 230, 232, 234, 236 and the branding 240, 245, 250 can be organized according to a hierarchy relationship. The hierarchy relationship can indicate which episodes 230, 232, 234, 236 to display in the slave region 220 when particular content (i.e. TV show) is selected from the master region 210. The hierarchy relationship further associates branding to television shows 212, 214, 216, 218 and related episodes 230, 232, 234, 236. Thus, certain types of branding can be rendered and displayed according to the master region 210 or the slave region 220 display in regards to content.

Specifically, in the master region 210, content is provided as a listing of four types of television shows 212, 214, 216, 218. The master region 210 can have a hierarchy rule that declares that branding can be applied to the master region 210 when all the content shares a common attribute, such as the same publisher or the same show title (i.e. serial identifier). The television shows 212, 214, 216, 218 listed in the master region 210 are all different and come from different publishers (i.e. TV networks, TV channels). Thus, due to the fact that the television shows 212, 214, 216, 218 do not share a common attribute, the region brander 150 does not apply branding in the master region 210.

The region brander 150 can allow a user 108 to select one of the television shows 212, 214, 216, 218. As illustrated in FIG. 2, the television show 214 titled "Pimp My Ride" is selected. Upon selection, the region brander 150 can render the slave region 220 to provide a listing of episodes 230, 232, 234, 236 for the selected television show 214. The region brander 150 can apply branding 240, 245, 250 throughout the slave region 220. For example, a title banner 240 can be displayed in the slave region 220. Graphical modifications for the branding can be applied to the slave region 220 such as stylized "flames" 245 at the top portion of the slave region 220 and graphical shading 250 (e.g. graffiti-like designs) in the background of the slave region 220.

Figure 3:
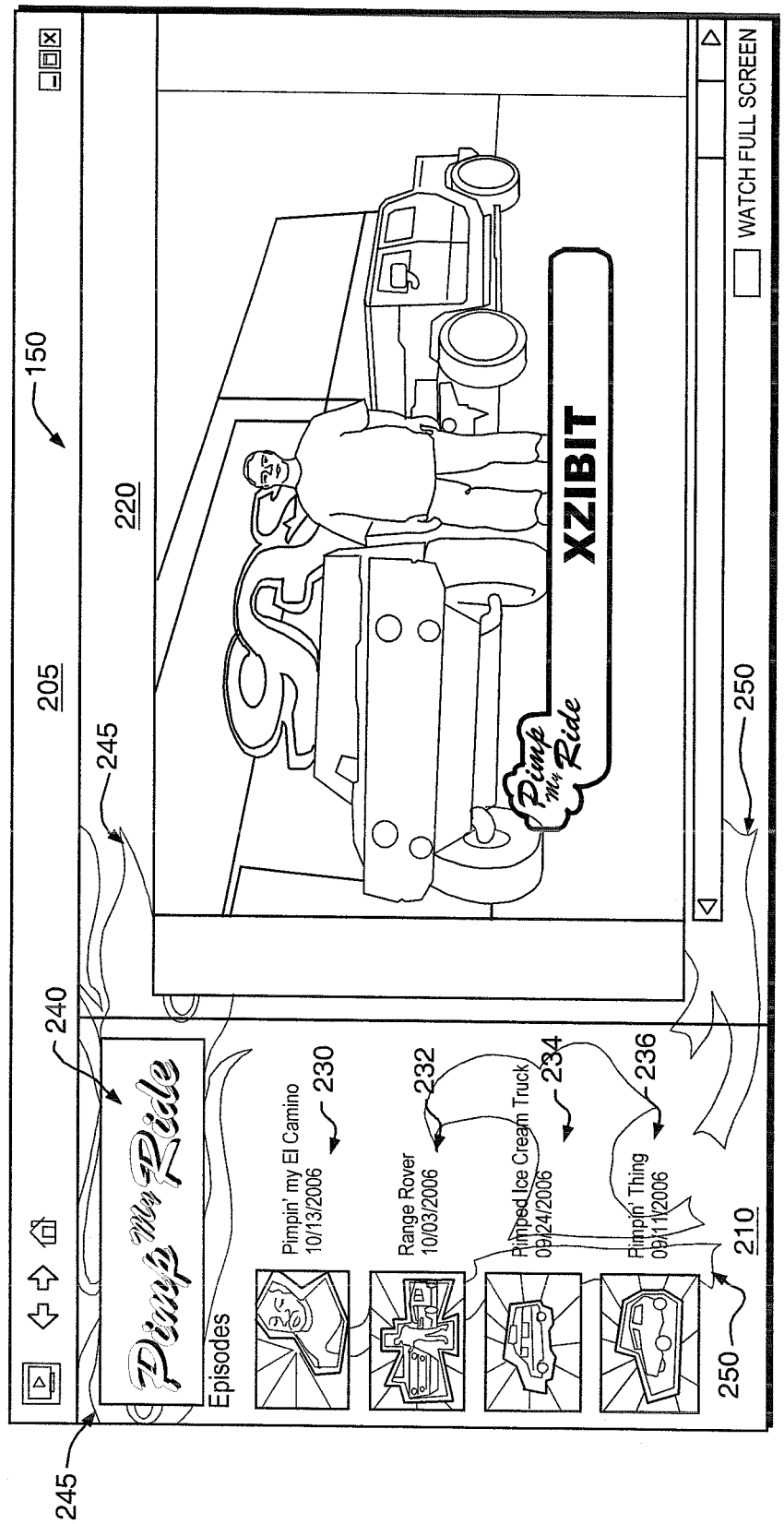
FIG. 3 is a block diagram of a graphical user interface of a region brander according to embodiments herein.

FIG. 3 is a block diagram of a graphical user interface of a region brander according to embodiments herein. FIG. 3 includes a GUI 205 of a region brander 150 with a master region 210 and a slave region 220. The master region 210 provides a menu of episodes 230, 232, 234, 236 of a television show. The slave region 220 provides for a video player 260. In addition, the region brander 150 allows for branding 240, 245, 250 to be uniformly applied across both the master region 210 and the slave region 220.

The menu of episodes 230, 232, 234, 236 in the master region 210 share the same publisher and are from the same show, hence, the hierarchy rule of the master region 210 can allow for the region brander 150 to brand 240, 245, 250 the master region 210. For example, a title banner 240 can be displayed in the master region 210. Graphical modifications for the branding can be applied to the master region 210 such as stylized "flames" 245 at the top portion of the master region 210 and graphical shading 250 in the background of the master region 210.

The region brander 150 can allow a user 108 to select one of the television episodes 230, 232, 234, 236 listed in the master region 210. Upon selection of a particular episode, the region brander 150 can render the slave region 220 to provide a video player 260 to play the episode selected from the master region 210. The hierarchy rule for the slave region 220 can apply the same branding as in the master region 210. Since all the content displayed in the both the master region 210 and the slave region 220 are related to the same TV show (i.e. "Pimp My Ride") and also come from the same publisher (i.e. MTV), the region brander 150 can uniformly brand 245, 250 both regions 210, 220 according to the hierarchy rules of both regions 210, 220. For instance, the stylized flames 245 applied in the master region 210 can "spill" over into the slave region 220. Also, the graphical shading 250 in the background of the master region 210 can be seamlessly continued in the slave region 220.

FIG. 4 is a flowchart of processing steps performed by the region brander 150 to define a hierarchy relationship, a master region, and a slave region according to embodiments herein. The steps in flowchart 400 relate to the features as illustrated in the block diagrams of FIGS. 1, 2 and 3.

At step 410, the region brander 150 defines a hierarchy relationship between content and embedded modification information (i.e. branding extensions) with respect a region in a Graphical User Interface (GUI) 205 of an application. The embedded modification information can be used to identify graphical modifications 240, 245, 250 to be made to the region of the GUI 205 based on a selection and/or presentation of the content.

To further define the hierarchy relationship, at step 420, the region brander 150 associates the content and episodic content with the embedded modification information (i.e. branding via branding extensions) to indicate the embedded modification information can be displayed in a master region 210 and/or a slave region 220 based on display and/or selection of the of the content and the episodic content.

For purposes of this document, it is understood that episodic content is comprised of a subset of portions of the content selected in the master region 210. Thus, episodic content can be individual episodes of a television show selected from the master region 210. In the alternative, episodic content can be songs from a playlist selected from the master region 210. In yet another embodiment of the region brander, episodic content can be chapters (or video frames) of a video selected from the master region 210. In other words, episodic content in a slave region 220 is related to content from a master region 210 in that it is related content that is divided into separate and related parts.

It is further understood that the branding extensions can be provided within a streaming data feed (e.g. RSS feed) and can be uniformly applied to content data and application data within the master region 210 and the slave region 220. Application data corresponds to a graphical presentation of the GUI 205, such as the individual graphic panels demarcating the master region 210 and the slave region 220. The content data corresponds to a graphical presentation of the content (and the related episodic content) in the GUI 205, such as the icons and text used to indicate individual episodes of a television show.

At step 430, the region brander 150 defines a master region 210 in the GUI 205 to apply the hierarchy relationship in order to display the content and the embedded modification information in the master region 210.

At step 440, the region brander 150 defines a slave region 220 in the GUI 205 to apply the hierarchy relationship in order to display the embedded modification information related to content selected from the master region 210, and to display, episodic content related to content selected from the master region 210.

Figure 5:
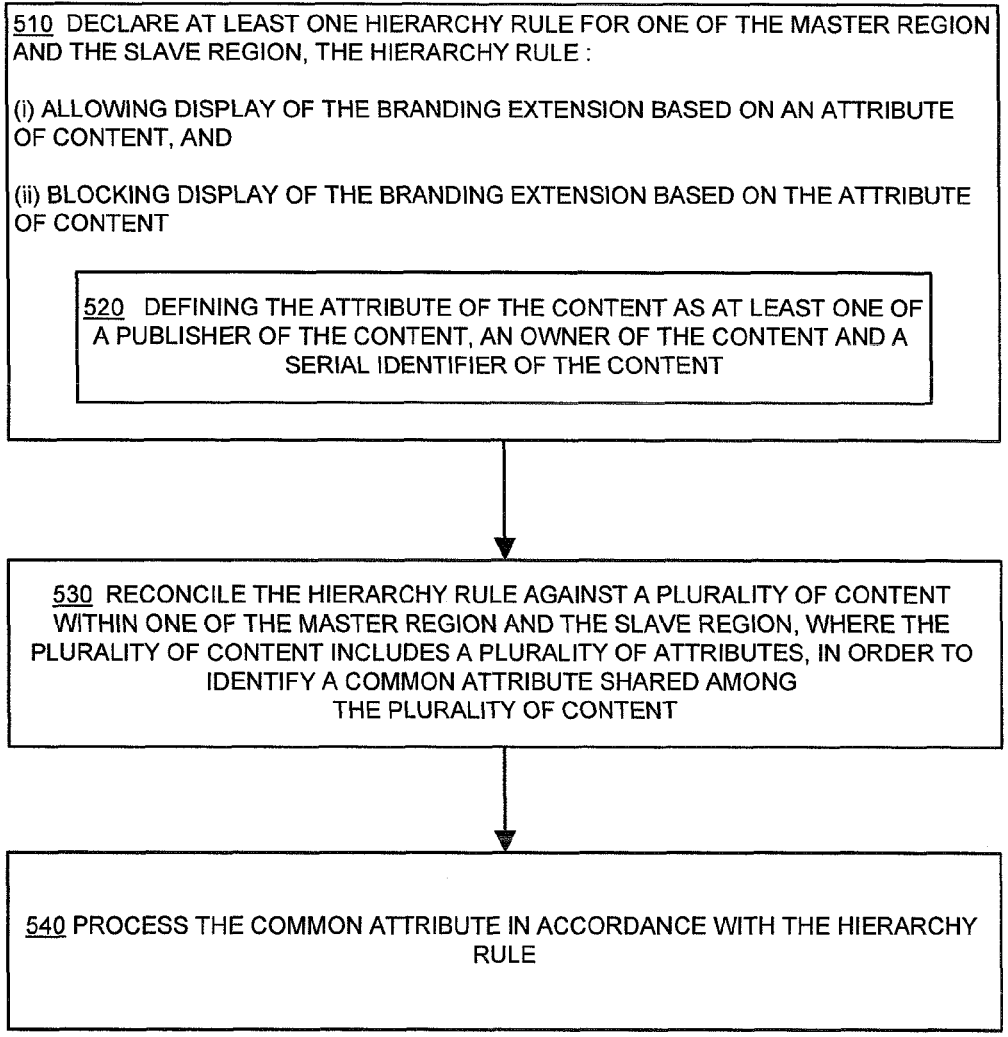
FIG. 5 is a flowchart of processing steps performed by a region brander to declare a hierarchy rule for a master region and a slave region according to embodiments herein.

FIG. 5 is a flowchart of processing steps performed by the region brander 150 to declare a hierarchy rule for a master region and a slave region according to embodiments herein. The steps in flowchart 500 relate to the features as illustrated in the block diagrams of FIGS. 1, 2 and 3.

At step 510, the region brander 150 declares a hierarchy rule for the master region 210 and/or slave region 220. The hierarchy rule can allow for the display of the branding extension based on an attribute of the content and can block display of the branding extension based on the attribute of the content. Thus, if the master region 210 lists music albums from the same recording artist, then the hierarchy rule for the master region 210 can allow a branding extension associated with the recording artist or the artist's recording label.

At step 520, the region brander 150 defines the attribute of the content as a publisher of the content, an owner of the content and a serial identifier (e.g. T.V. show title) of the content.

In order to identify a common attribute shared among the plurality of content, at step 530, the region brander 150 reconciles the hierarchy rule against a plurality of content within the master region 210 and/or the slave region 220 where the plurality of content includes a plurality of attributes. For example, if the slave region 220 lists multiple movies, the slave region's 220 hierarchy rule determines the common attribute amongst all the listed movies. For example, each movie can be from the same movie studio, movie franchise, or movie genre. If no common attribute is found, then the slave region 220 can block branding extensions from being applied in the slave region 220.

At step 540, the region brander 150 processes the common attribute in accordance with the hierarchy rule. Continuing with the example of step 530, if all the listed movies share a common movie franchise (e.g. Star Wars, James Bond), then branding related to the movies can be applied in the slave region 220.

Figure 6:
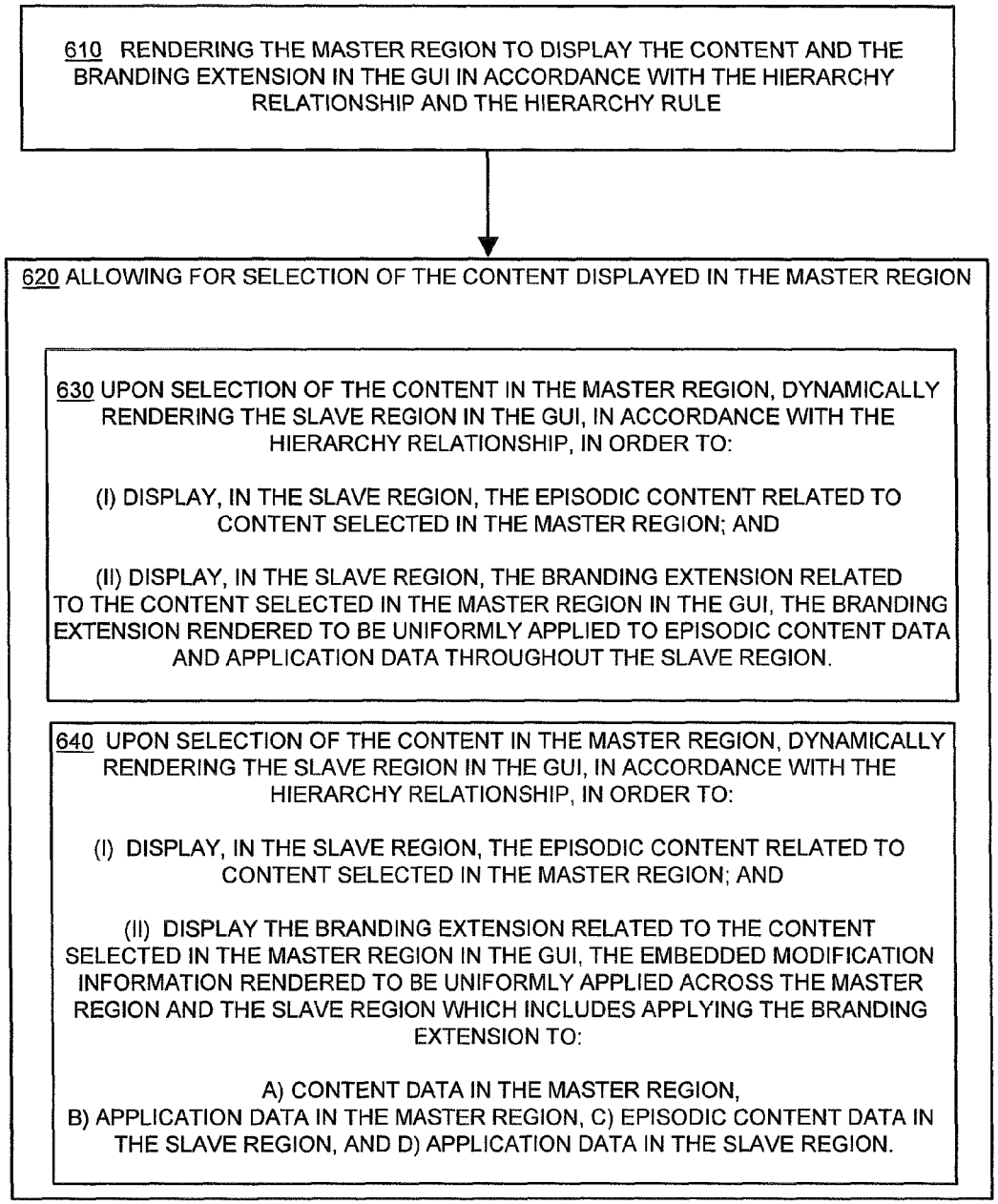
FIG. 6 is a flowchart of processing steps performed by a region brander to render a master region and a slave region according to embodiments herein.

FIG. 6 is a flowchart of processing steps performed by the region brander 150 to render a master region and a slave region according to embodiments herein. The steps in flowchart 600 relate to the features as illustrated in the block diagrams of FIGS. 1, 2 and 3. For purposes of flowchart 600, it is understood that steps 630 and 640 are arbitrarily numbered.

At step 610, the region brander 150 renders the master region 210 to display the content and the branding extension in the GUI 205 in accordance with the hierarchy relationship and the hierarchy rule. At step 620, the region brander 150 allowing for selection of the content displayed in the master region 210.

Upon selection of the content in the master region 210, at step 630, the region brander 150 dynamically renders the slave region 220 in the GUI 205 in accordance with the hierarchy relationship, in order to display the episodic content related to content selected from the master region 210 and the branding extension related to the content selected from the master region 210 in the GUI 205. The branding extension can be rendered to be uniformly applied to episodic content data and application data throughout the slave region 220.

For example, in an embodiment of the region brander 150, if a user 108 selects an album from an album list in the master region 210, episodic content (i.e. songs) related to the selected album with be displayed in a rendered slave region 220. A branding extension related to the selected album and the songs via the hierarchy relationship can be applied to the slave region 220.

Upon selection of the content in the master region 210, at step 640, the region brander 150 dynamically renders the slave region 220 in the GUI 205, in accordance with the hierarchy relationship, in order to display the episodic content related to content selected from the master region 210 and the branding extension related to the content selected from the master region 210 in the GUI 205.

In step 640, the branding extension can be rendered to be uniformly applied across both the master region 210 and the slave region 220. Hence, the branding extension is seamlessly applied to: the content data in the master region 210, the application data in the master region 210, the episodic content data in the slave region 220, and the application data in the slave region 220.

It is noted that example configurations disclosed herein include the region brander application 150-1 itself (i.e., in the form of un-executed or non-performing logic instructions and/or data). The region brander application 150-1 may be stored on a computer readable medium (such as a floppy disk), hard disk, electronic, magnetic, optical, or other computer readable medium.

Note again that techniques herein are well suited for a region brander configured to uniformly apply branding (i.e graphical modifications) upon both content data and application data to effectuate a seamless branding of an entire region (or multiple regions) of a graphical user interface (GUI). However, it should be noted that embodiments herein are not limited to use in such applications and that the techniques discussed herein are well suited for other applications as well.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A computer implemented method comprising:
displaying in a master region a selectable list of available content, wherein content is video or audio content, the list comprising at least a first content item and a second content item, the master region comprising a master region graphic interface for display of graphics;
displaying in a slave region episodic content related to the first content item selected in the master region, the episodic content and the first content item sharing a common first attribute, an attribute thematically describing the episodic content, the slave region comprising of a slave region graphic interface for display of graphics;
determining whether the first content item and the second content item share the common first attribute;
based on determining that the first content item and the second content item share the common first attribute:
determining a branding extension corresponding to a brand associated with the common first attribute, the branding extension comprising graphics that identify the brand; and
displaying the branding extension across the master region graphic interface and the slave region graphic interface to provide common branding of the slave region and the master region; and
based on determining that the first content item and the second content item do not share the common first attribute determining a second branding extension corresponding to a common second attribute of the episodic content and the first content item; and
displaying a second graphical modification associated with the second branding extension across the slave region graphic interface.

2. The method of claim 1, wherein determining whether the first content item and the second content item share the common attribute comprises determining whether the first content item and the second content item share a brand, the graphical modification identifying the brand.

3. The method of claim 1, wherein determining whether the first content item and the second content item share the common attribute comprises determining whether the first content item and the second content item are episodes of a program, the graphical modification identifying the program.

4. The method of claim 1, wherein the graphical modification is displayed on a graphic panel extending across the master region and the slave region.

5. A computer program product comprising a non-transitory computer readable medium embodying program code, the program code comprising:
program code for rendering an interface of a media player, the interface including a master region and a slave region;
program code for displaying in the master region a selectable list of available content, wherein content is video or audio content, the list comprising at least a first content item and a second content item, the master region comprising a master region graphic interface for display of graphics;
program code for displaying in the slave region episodic content related to the first content item selected in the master region, the episodic content and the first content item sharing a common first attribute, an attribute thematically describing the episodic content, the slave region comprising of a slave region graphic interface for display of graphics;
program code for determining whether the first content item and the second content item share the common first attribute;
program code for determining a branding extension corresponding to a brand associated with the common first attribute, the branding extension comprising graphics that identify the brand;
program code for displaying the branding extension across the master region graphic interface and the slave region graphic interface to provide common branding of the slave region and the master region; and
based on determining that the first content item and the second content item do not share the common first attribute determining a second branding extension corresponding to a common second attribute of the episodic content and the first content item; and displaying a second graphical modification associated with the second branding extension across the slave region graphic interface.

6. The computer program product of claim 5, wherein the graphical modification changes according to selection of different available content.

7. A system, comprising:

a processor; and a memory, wherein the memory embodies program instructions comprising:

program instructions that configure the processor to render an interface of a media player, the interface including a master region and a slave region;

program instructions that configure the processor to display in the master region a selectable list of available content items, wherein content is video or audio content, the list comprising at least a first content item and a second content item, the master region comprising a master region graphic interface for display of graphics;

program instructions that configure the processor to display in the slave region episodic content related to the first content item selected in the master region, the episodic content and the first content item sharing a first common attribute, an attribute thematically describing the episodic content, the slave region comprising of a slave region graphic interface for display of graphics;

program instructions that configure the processor to determine whether the first content item and the second content item share the first common attribute;

program instruction that configure the processor to determine a branding extension corresponding to a brand associated with the common first attribute, the branding extension comprising graphics that identify the brand;

program instructions that configure the processor to, based on determining that the first content item and the second content item share the common first attribute:

display the branding extension across the master region graphic interface and the slave region graphic interface to provide common branding of the slave region and the master region; and based on determining that the first content item and the second content item do not share the common first attribute determining a second branding extension corresponding to a common second attribute of the episodic content and the first content item; and displaying a second graphical modification associated with the second branding extension across the slave region graphic interface.

8. The system of claim 7, wherein the graphical modification changes according to a different selection of available content items.

9. The system of claim 7, wherein determining whether the first content item and the second content item share the common attribute comprises determining whether each of the first content item and the second content item is provided by a common publisher; and wherein the graphical modification is associated with the publisher.

10. The system of claim 7, wherein determining whether the first content item and the second content item share the common attribute comprises determining whether the first content item and the second content item share a brand; and wherein the graphical modification is associated with the brand.

11. The system of claim 7, wherein determining whether the first content item and the second content item share the common attribute comprises determining whether the first content item and the second content item are both from the same franchise; and wherein the graphical modification is associated with the franchise.

* * * * *